United States Patent
Keiser et al.

(10) Patent No.: US 11,610,412 B2
(45) Date of Patent: Mar. 21, 2023

(54) VEHICLE NEURAL NETWORK TRAINING

(71) Applicant: Ford Global Technologies, LLC, Dearborn, MI (US)

(72) Inventors: Lynn Valerie Keiser, Sunnyvale, CA (US); Timur Gilmanov, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 214 days.

(21) Appl. No.: 17/024,947

(22) Filed: Sep. 18, 2020

(65) Prior Publication Data

US 2022/0092321 A1    Mar. 24, 2022

(51) Int. Cl.
*G06V 20/58*  (2022.01)
*G06K 9/62*   (2022.01)
*G06N 3/04*   (2023.01)
*G06N 3/08*   (2023.01)

(52) U.S. Cl.
CPC ......... *G06V 20/584* (2022.01); *G06K 9/6256* (2013.01); *G06K 9/6277* (2013.01); *G06N 3/0454* (2013.01); *G06N 3/08* (2013.01)

(58) Field of Classification Search
CPC ...... G06V 20/584; G06V 20/54; G06V 20/58; G06V 10/82; G06K 9/6256; G06K 9/6277; G06N 3/0454; G06N 3/08
See application file for complete search history.

(56) References Cited

U.S. PATENT DOCUMENTS

| | | | |
|---|---|---|---|
| 9,230,441 B2 | 1/2016 | Sung et al. | |
| 9,260,122 B2 | 2/2016 | Haas et al. | |
| 10,885,388 B1* | 1/2021 | Kim | G06N 20/00 |
| 2008/0112593 A1 | 5/2008 | Ratner et al. | |
| 2014/0347511 A1* | 11/2014 | Rodriguez-Serrano | G06V 20/584 348/222.1 |
| 2018/0053059 A1* | 2/2018 | Mei | G06V 20/582 |
| 2018/0121763 A1 | 5/2018 | Sumilia et al. | |
| 2018/0336780 A1* | 11/2018 | Ran | G08G 1/0968 |
| 2018/0373980 A1* | 12/2018 | Huval | G06N 3/08 |
| 2019/0156121 A1 | 5/2019 | Kucharski et al. | |
| 2019/0156837 A1* | 5/2019 | Park | G10L 17/06 |
| 2019/0266439 A1* | 8/2019 | Nien | G06V 20/00 |
| 2019/0392712 A1* | 12/2019 | Ran | G08G 1/167 |
| 2020/0020227 A1* | 1/2020 | Ran | G08G 1/075 |
| 2020/0105111 A1* | 4/2020 | Messer | G08B 13/19678 |
| 2021/0001882 A1* | 1/2021 | Mortazavi | B60W 60/0011 |
| 2021/0004589 A1* | 1/2021 | Turkelson | G06V 10/82 |
| 2021/0020035 A1* | 1/2021 | Tijink | G06Q 50/30 |

(Continued)

*Primary Examiner* — Solomon G Bezuayehu
(74) *Attorney, Agent, or Firm* — Frank A. MacKenzie; Bejin Bieneman PLC

(57) ABSTRACT

A computer, including a processor and a memory, the memory including instructions to be executed by the processor to determine a vehicle sensor object label, and a vehicle sensor confidence level for the vehicle sensor object label, by processing a vehicle sensor image with a neural network, determine a stationary sensor object label, and a stationary sensor confidence level for the stationary sensor object label, by processing a stationary sensor image with the neural network, and if the stationary sensor confidence level is greater than the vehicle sensor confidence level, operate a vehicle by determining a vehicle path based on the stationary sensor object label.

20 Claims, 5 Drawing Sheets

(56) References Cited

U.S. PATENT DOCUMENTS

| | | | |
|---|---|---|---|
| 2021/0081668 A1* | 3/2021 | Mehnert | G06V 20/00 |
| 2021/0089570 A1* | 3/2021 | Hunter | G06F 16/5846 |
| 2021/0163021 A1* | 6/2021 | Frazzoli | H04W 4/00 |
| 2021/0323555 A1* | 10/2021 | Sholingar | B60W 30/18036 |
| 2022/0126864 A1* | 4/2022 | Moustafa | B60W 60/0057 |
| 2022/0126878 A1* | 4/2022 | Moustafa | B60W 50/00 |

* cited by examiner

VEHICLE NEURAL NETWORK TRAINING

BACKGROUND

Vehicles can be equipped with computing devices, networks, sensors and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway.

DETAILED DESCRIPTION

Figure 1:
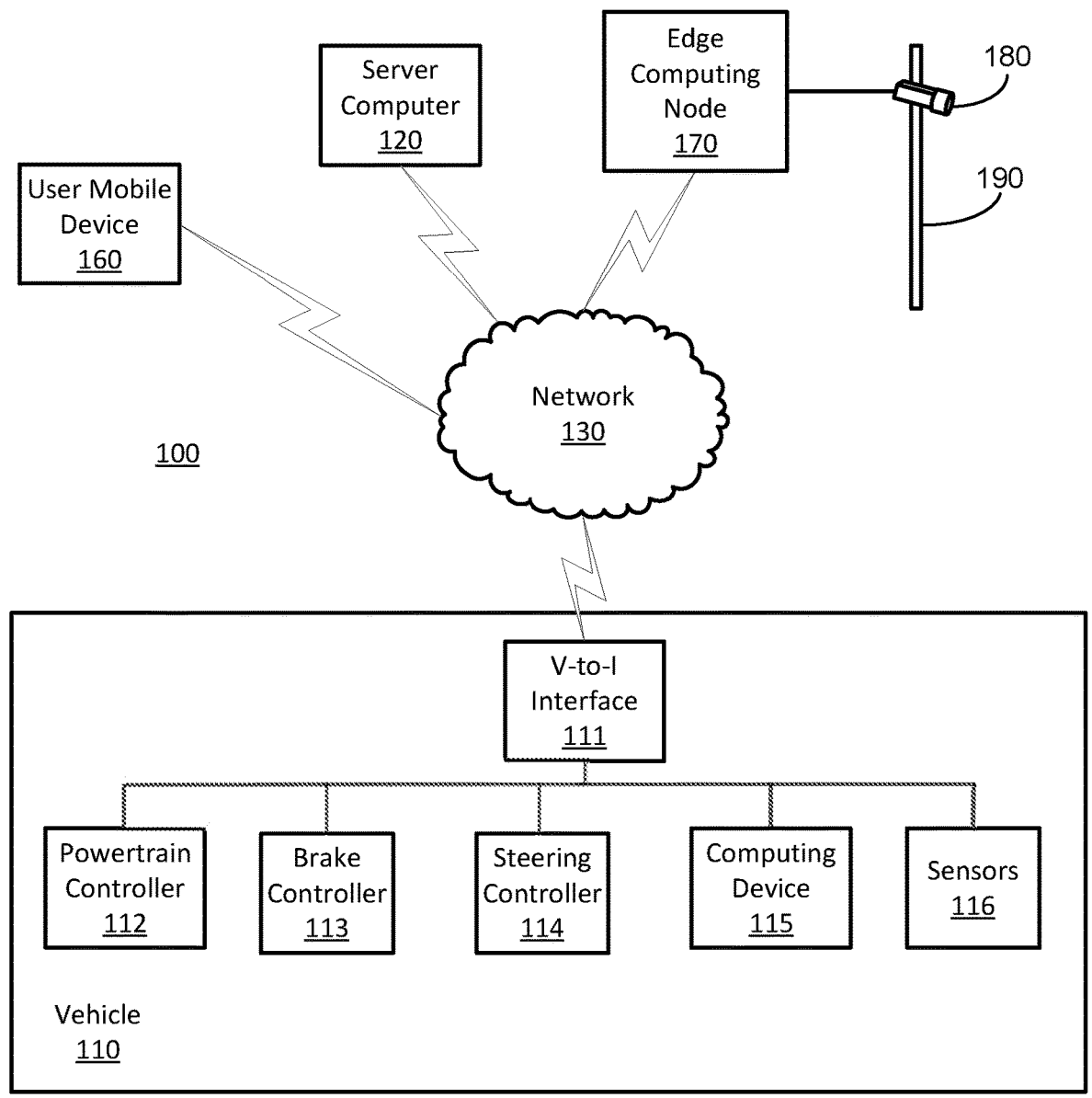
FIG. 1 is a diagram of an example traffic infrastructure system.

A computing device in a vehicle or in a traffic infrastructure system can be programmed to acquire data regarding the external environment of a vehicle and to use the data to determine a vehicle path upon which to operate a vehicle in an autonomous or semi-autonomous mode. A vehicle can operate on a roadway based on a vehicle path by determining commands to direct the vehicle's powertrain, braking, and steering components to operate the vehicle to travel along the path. The data regarding the external environment can include the location of one or more objects such as vehicles and pedestrians, etc., in an environment around a vehicle and can be used by a computing device in the vehicle to operate the vehicle.

A computing device in a vehicle, in a traffic infrastructure system or in another participating device (cell phone, vehicle, server, edge compute node, etc.) can be programmed to determine object labels on behalf of a vehicle. This entire process may be carried out by the computing device in vehicle, but may also be supplemented by an edge computing node and other computers outside vehicle. An object label is a text string that identifies an object in an image. For example, a video camera included in a vehicle can acquire an image of a traffic scene. The acquired image can be communicated to a computing device in the vehicle. The computing device can include a software program such as a convolutional neural network (CNN) that has been previously trained to determine labels for objects that occur in the acquired image while operating on a roadway. The remainder of this document shall use "CNN" to represent any such system that can perform image processing and object classification, but other types of software programs and hardware devices as are known can perform similar functions. A CNN will be described below in relation to FIG. 2. This or another computing device can use the determined labels to operate the vehicle. For example, the computing device can determine a vehicle path that avoids contact with the labeled object. A vehicle path can be a curve or curves (including a line or lines) described by one or more polynomial equations upon which the vehicle can be instructed to operate by the computing device by controlling vehicle powertrain, braking and steering. The polynomial curve can be determined to maintain upper and lower limits on lateral and longitudinal accelerations, thereby providing safe and efficient operation of the vehicle.

Software programs such as CNNs depend upon training to determine object labels in image data. A CNN can be trained by presenting the CNN with a large number (typically >1000) of training images that include objects along with corresponding ground truth. Ground truth is defined as data regarding a correct solution, in this example the label and location for an object in an image, obtained from a source independent from the CNN to be trained. In this example ground truth regarding the training images are typically obtained by having a human determine a label and location for an object in an image by visual inspection of the image. During training the CNN processes an input image and the result, referred to herein as an output state, is compared to the ground truth to train the CNN to produce an output state that matches the ground truth in response to inputting an image that corresponds to the ground truth. Techniques discussed herein improve obtaining ground truth to operate a vehicle and train a CNN by obtaining object labels from data acquired by sensors located remotely from the vehicle, i.e. stationary sensors included in a traffic infrastructure system or sensors located in other vehicles.

Producing a training dataset of images and corresponding ground truth for training a CNN can be an expensive and time consuming process, i.e., is inefficient and challenging in terms of consumption of computing resources. Further, a trained CNN has limited ability to generalize beyond the training dataset. A CNN can be successfully trained to correctly label objects such as passenger vehicles and trucks using a dataset that includes a sample of passenger vehicles and trucks. A CNN trained to label passenger vehicles and trucks might not be able to successfully label a vehicle if the image of the vehicle includes a confusing background, or the image of the vehicle is partially obscured by foliage or shadows or other vehicles etc. In other examples the view of the vehicle can be different than the views of the vehicle included in the training dataset. For example, the vehicle can be viewed from an angle that was not included in prior labeled training data. A confusing background is defined as an image that includes features that are close enough in appearance to a vehicle that a trained CNN will generate false alarms, where a false alarm is defined as an output state that includes a labeled object where no such object occurs in the input image. Also, changing environmental conditions including weather, lighting, and shadows can prevent a CNN from successfully labeling an object. A CNN trainer tries to anticipate as many of the types of objects the CNN will be required to label along with as many of the environments in which the objects will occur as permitted by the time and resources available for training.

As soon as a CNN is released into an operational vehicle deployed for use under real-world conditions, a possibility exists that the CNN will be required to label an object in conditions that were not anticipated during training. Techniques discussed herein improve the operation of a CNN in labeling objects by acquiring additional images of an object from cameras included in a traffic infrastructure system or other nearby vehicles, in addition to cameras included in the vehicle. The additional images of an object are processed by the CNN and confidence scores output by the CNN for an object labels from the vehicle camera image and the traffic infrastructure images are compared. The object label with the highest confidence value is used by the computing device in the vehicle for vehicle operation. In examples where a traffic infrastructure image object label has a higher confidence value than the vehicle image object label, and the vehicle image and the traffic infrastructure image object label are stored in the computing device to be uploaded to a server computer where the CNN can be retrained using the vehicle image and the traffic infrastructure image object label. Retraining the CNN by using this automated labeling method can reduce the time and expense required to train a CNN by reducing the need to anticipate every possible configuration of objects and environmental conditions to be encountered in the real-world. Alternatively, if the vehicle's view of the object has higher confidence than the image obtained from the infrastructure camera, then the label from the ego vehicle camera and the image from the infrastructure camera can also be uploaded to a server to retrain the computing device to permit it to detect the object in the view from the infrastructure camera more effectively.

Disclosed herein is a method, including determining a vehicle sensor object label, and a vehicle sensor confidence level for the vehicle sensor object label, by processing a vehicle sensor image with a neural network, determining a stationary sensor object label, and a stationary sensor confidence level for the stationary sensor object label, by processing a stationary sensor image with the neural network, and if the stationary sensor confidence level is greater than the vehicle sensor confidence level, operating a vehicle by determining a vehicle path based on the stationary sensor object label. The neural network can be retrained by applying the stationary sensor object label to the vehicle sensor image when the stationary sensor confidence level is greater than the vehicle sensor confidence level. The vehicle path can be based on a polynomial function and the vehicle path avoids contact or near-contact with an object corresponding to the vehicle sensor object label. The vehicle sensor confidence level and the stationary sensor confidence level can be probabilities that the vehicle sensor object label and the stationary sensor object label are correctly identified by the neural network. The stationary sensor image can include data regarding a location of the stationary sensor object and a time at which the stationary sensor image was acquired. The location of the stationary sensor object can be a real-world location in global coordinates and is based on a location and orientation of the stationary sensor.

The vehicle sensor object and the stationary sensor object can be determined to be different views of a same object based on the location of the vehicle sensor object, the location of the stationary sensor object, and the time at which the stationary sensor object was acquired. The neural network can include convolutional layers and fully connected layers. The neural network can be trained using training datasets that include images of objects and ground truth that includes object labels. A second neural network can be included in a traffic infrastructure system is used to determine the stationary sensor object label and the stationary sensor confidence level. The traffic infrastructure system can include a second computer including a second processor and second memory including instructions executable by the second processor to retrain the neural network by applying the stationary sensor object label to the vehicle sensor image. The second computer can download the retrained neural network to the computer. The vehicle can be operated by controlling vehicle powertrain, vehicle brakes and vehicle steering. The stationary sensor object label, and a stationary sensor confidence level for the stationary sensor object label, can be determined by processing a sensor image acquired by a second vehicle with the neural network.

Further disclosed is a computer readable medium, storing program instructions for executing some or all of the above method steps. Further disclosed is a computer programmed for executing some or all of the above method steps, including a computer apparatus, programmed to determine a vehicle sensor object label, and a vehicle sensor confidence level for the vehicle sensor object label, by processing a vehicle sensor image with a neural network, determine a stationary sensor object label, and a stationary sensor confidence level for the stationary sensor object label, by processing a stationary sensor image with the neural network, and if the stationary sensor confidence level is greater than the vehicle sensor confidence level, operate a vehicle by determining a vehicle path based on the stationary sensor object label. The neural network can be retrained by applying the stationary sensor object label to the vehicle sensor image when the stationary sensor confidence level is greater than the vehicle sensor confidence level. The vehicle path can be based on a polynomial function and the vehicle path avoids contact or near-contact with an object corresponding to the vehicle sensor object label. The vehicle sensor confidence level and the stationary sensor confidence level can be probabilities that the vehicle sensor object label and the stationary sensor object label are correctly identified by the neural network. The stationary sensor image can include data regarding a location of the stationary sensor object and a time at which the stationary sensor image was acquired. The location of the stationary sensor object can be a real-world location in global coordinates and is based on a location and orientation of the stationary sensor.

The computer can be further programmed to determine that the vehicle sensor object and the stationary sensor object are different views of a same object based on the location of the vehicle sensor object, the location of the stationary sensor object, and the time at which the stationary sensor object was acquired. The neural network can include convolutional layers and fully connected layers. The neural network can be trained using training datasets that include images of objects and ground truth that includes object labels. A second neural network can be included in a traffic infrastructure system is used to determine the stationary sensor object label and the stationary sensor confidence level. The traffic infrastructure system can include a second computer including a second processor and second memory including instructions executable by the second processor to retrain the neural network by applying the stationary sensor object label to the vehicle sensor image. The second computer can download the retrained neural network to the computer. The vehicle can be operated by controlling vehicle powertrain, vehicle brakes and vehicle steering. The stationary sensor object label, and a stationary sensor confidence level for the stationary sensor object label, can be determined by processing a sensor image acquired by a second vehicle with the neural network.

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Traffic infrastructure system 100 can include one or more edge computing nodes 170. Edge computing nodes 170 are computing devices as described above that are located near roadways, and can be in communication with stationary or moveable sensors 180. For example, a sensor 180 can be a stationary video camera attached to a pole 190, building, or other stationary structure to give the sensor 180 a view of traffic. Mobile sensors 180 can be mounted on drones or other mobile platforms to provide views of traffic from positions not available to stationary sensors. Edge computing nodes 170 further can be in communication with computing devices 115 in vehicle 110, server computers 120, and user mobile devices 160 such as smart phones. Server computers 120 can be cloud-based computer resources that can be called upon by edge computing nodes 170 to provide additional computing resources when needed.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer.

Figure 2:
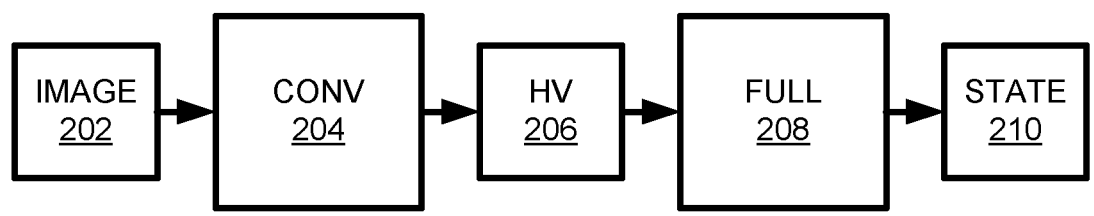
FIG. 2 is a diagram of an example convolutional neural network.

FIG. 2 is a diagram of a CNN 200. A CNN 200 is a software program that can execute on a computing device 115 included in a vehicle 110 and/or in the edge computing node 170 and/or in the server computer 120 and/or in the user mobile device 160. A CNN 200 inputs and processes an image 202. An image 202 can be acquired by a video camera included as a sensor 116 in a vehicle 110, for example. An image 202 can also be acquired by a sensor 180, which can be a video camera, included in a traffic infrastructure system 100 and communicated to the CNN 200 in a computing device 115 by an edge computing node 170 via a network 130. CNN 200 processes an input image 202 and produces output states (STATE) 210 that include object labels, an object location, and a confidence value for each object label.

A CNN includes convolutional layers (CONV) 204. Convolutional layers 204 use a plurality of convolutional kernels to reduce an input image 202 to hidden variables (HV) 206. The hidden variables 206 are an encoded representation of the input image 202 that includes data corresponding to objects in the input image 202. The hidden variables 206 are input to fully connected layers (FULL) 208 that process the hidden variables 206 to produce output states 210 corresponding to object labels, an object location, and a confidence value for the object label. The confidence value is an estimate of a probability that the object label is correct. A CNN 200 can be trained to output a confidence value by processing hidden variables 206 with fully connected layers 208. The fully connected layers 208 can determine a confidence value corresponding to a probability that an object label is the correct object label by processing hidden variables 206 corresponding to the object label. A CNN 200 can output more than one object label each with corresponding object confidence levels for an object occurring in an input image 202.

A CNN 200 can be trained to input an image 202 and output states 210 including object labels, object locations and object confidence levels using a training dataset that includes training images 202 that include objects and ground truth corresponding to the objects included in the images. As defined above, ground truth includes labels for the objects obtained independently from the CNN 200. For example, a human can view the training images 202 in the training dataset and determine object labels. An object location corresponding to the object label can be determined by measuring the location of the object in real world coordinates in the real-world traffic scene corresponding to the training image 202. Real world coordinates specify a location in the real, i.e., physical, world, and typically are three dimensional coordinates measured with respect to a global coordinate system such as latitude, longitude, and altitude. The object location can also be estimated using photogrammetry techniques on the training image. Photogrammetry is a technique that uses measurements in pixels of locations of objects in an image, and data regarding real-world of measurements of objects such as height and width of a make and model of vehicle, to determine real-world locations of objects in an image. CNN 200 can be trained to output confidence levels by keeping track of the number n or correct labels produced by the CNN 200 for an image and calculating a confidence value based on the percentage of correct labels produced. The calculated confidence value can be included in the ground truth and the CNN 200 trained to produce the calculated confidence value upon inputting the corresponding image.

A training image 202 can be input to a CNN 200 and a plurality of tests can be run while varying the parameters used to program the convolutional layers 204 and fully connected layers 208. After each run the output states 210 are back-propagated to compare with the ground truth. Parameters that correspond to correct answers as confirmed by comparing the output states 210 to the ground truth are saved as candidate parameters. Following the test runs, the candidate parameters that produce the correct results are saved as the parameters that will be used to program the CNN 200 during operation.

Figure 3:
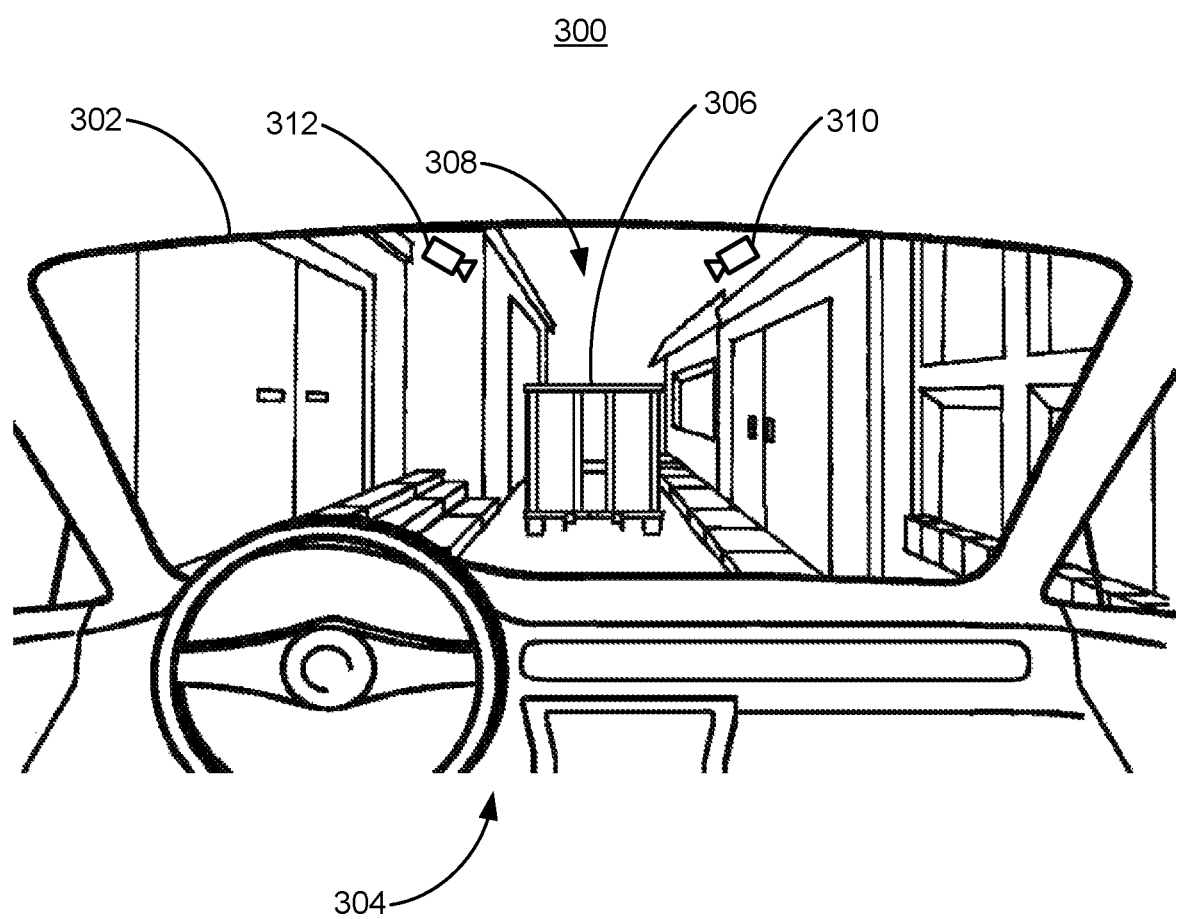
FIG. 3 is a diagram of an example traffic scene.

FIG. 3 is a diagram of a traffic scene 300, viewed through a windshield 302 from an interior 304 of a vehicle 110. Traffic scene 300 includes a truck 306, viewed from the rear. The truck 306 is traveling on a narrow street surrounded closely by objects 308 including buildings, sidewalks, steps, etc. The nearby objects 308 can prevent a trained CNN 200 from correctly labeling the truck 306 successfully because of image details touching to adjacent to the outline of the truck 306, shadows cast over the truck 306 and low image contrast between the truck 306 and nearby objects 308. Typically, when a CNN 200 is trained to label an object such as a truck 306, the training dataset includes images of trucks 306 where the outline of the truck 306 is clearly visible from the background. An image of a traffic scene 300, where the image of the truck 306 is viewed against a confusing background including nearby objects 308 can cause a CNN 200 to mis-label objects it has been previously trained to label correctly.

Another problem with labeling objects in traffic scenes 300 is that the object, in this example a truck 306, can be viewed at an angle that makes labeling difficult. In this example, the truck 306 is viewed from directly behind. Because a truck 306 can present an essentially featureless rectangle when viewed from the back, it can be difficult to train a CNN 200 to accurately label a truck 306 when viewed from behind. Techniques discussed herein can overcome these problems in labeling objects by using data from cameras 310, 312 included in a traffic infrastructure system 100. As discussed in relation to FIG. 1, a traffic infrastructure system can include stationary cameras 310, 312, which can be video cameras, in communication with edge computing nodes 170. The edge computing nodes 170 can be in communication with computing devices 115 included in a vehicle to transmit images that include the truck 306, taken from angles which differ from the angle from which the vehicle 110 can acquire images of the truck 306.

A computing device 115 in a vehicle 110 can determine that additional images from a traffic infrastructure system 100 can be of assistance in labeling an object by examining the confidence levels that accompany a label output by a CNN 200. As discussed above in relation to FIG. 2, a CNN 200 can be trained to output a confidence level that corresponds to a label output by the CNN 200 in response to an input image. As discussed above, a CNN 200 includes convolutional layers 204 that output hidden variables 206. The hidden variables 206 can include values corresponding to features that are used to determine one or more labels for objects in input images 202 by fully connected layers 208. Fully connected layers 208 can compare the values corresponding to each label and determine a confidence level corresponding to each label.

Figure 4:
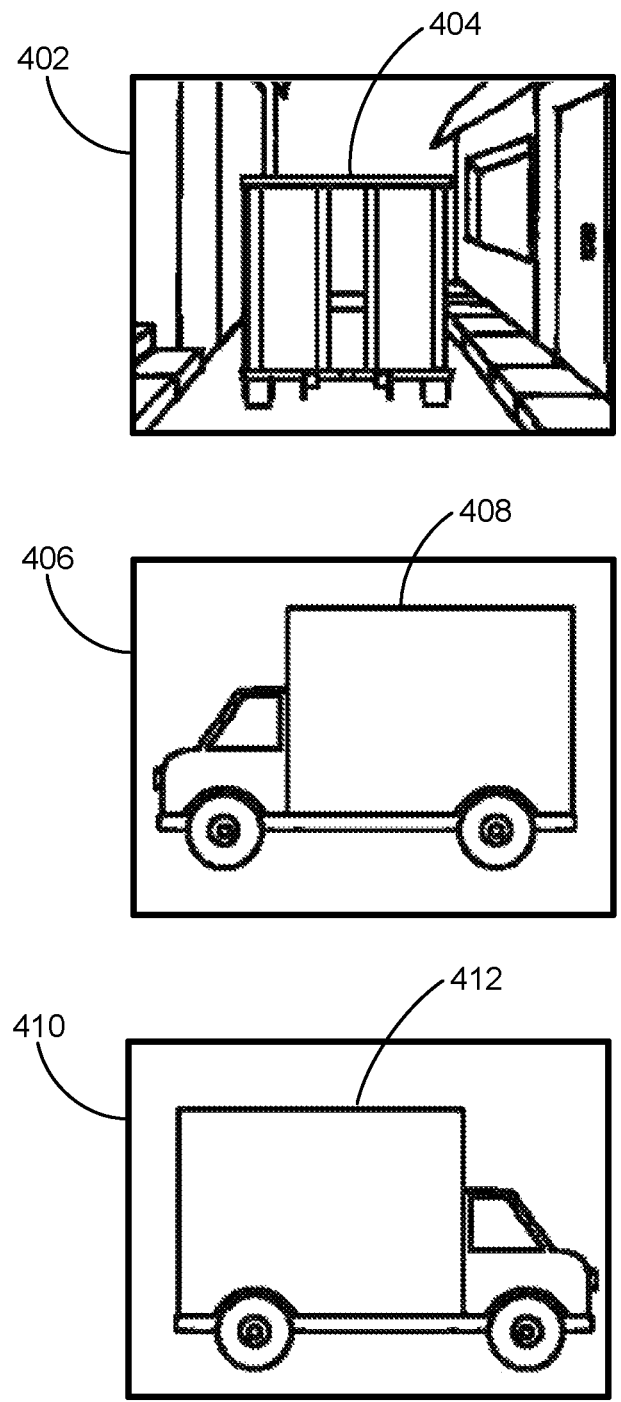
FIG. 4 is a diagram of three images of a traffic scene.

FIG. 4 is a diagram of three images 402, 406, 410 of traffic scene 300 from FIG. 3. Image 402 is acquired by a camera included in a vehicle 110, image 406 is acquired by stationary camera 312 from FIG. 3, and image 410 is acquired by stationary camera 310 from Fig. A CNN 200 included in a computing device 115 in vehicle 110 can input image 402 and output labels and confidence levels corresponding to the labels. In examples where CNN 200 can determine a label for object 404 in image 402 with a confidence level greater than a threshold, for example 80%, computing device 115 can use the object label to determine a vehicle path for the vehicle 110 without acquiring image data from stationary cameras 310, 312 included in a traffic infrastructure system 100. In addition, image data from stationary cameras 310 and 312 may be directly sent via network 130 to the computing device 115 in the vehicle 110, such that the vehicle may directly determine labels from the stationary camera images, without the need for edge computing nodes to perform this processing.

The confidence level threshold can be determined by experimentation using a CNN 200 in vehicle 110 and a plurality of images of real world objects in real world traffic scenes. The real world objects can be classified by type and view by human observers. For example, an object can be a car or a truck, etc. and the object can be viewed from the front, back or side. The traffic scenes can be classified by environmental conditions, including lighting (full sunlight, overcast, partial shade, nighttime, etc.) and precipitation (none, rain, snow, etc.). Object labels output by a CNN 200 corresponding to each class of object/environmental conditions can be compared to an object label assigned by a human observer. The percentage of correct labels compared to the human observer for each object/environmental condition class can be calculated and used as ground truth to train the CNN 200 to assign a confidence level to each object/environmental condition class label.

In this example, the CNN 200 outputs three labels for object 404 with corresponding confidence levels: (1) Dumpster, confidence level 68%; (2) Container, confidence level 19%; (3) Truck, confidence level 9%. Because no label for object 404 has a confidence level above 80%, the computing device 115 in the vehicle 110 can request assistance from a one or more edge computing nodes 170 in a traffic infrastructure system 100 to determine whether the edge computing nodes 170 have image data that can assist the computing device 115 in determining a high confidence, for example >80%, label for the object 404. In addition, image data from stationary cameras 310 and 312 may be directly sent via network 130 to the computing device 115 in the vehicle 110, such that the vehicle may directly determine labels from the stationary camera images at a high confidence level, such as >80%, without the need for edge computing nodes to perform this processing.

Computing device 115 can communicate with edge computing nodes 170 via a network 130 to obtain images 406, 410 of a traffic scene 300 that include the object 404 that returned low confidence levels when labeled by a CNN 200. Data acquired by the computing device in vehicle 110 can include data regarding the real-world location and orientation of the stationary camera 310, 312 that acquired the images. The real-world location and orientation of stationary cameras 310, 312 can be determined at the time they are installed using GPS and surveying equipment, for example. The real-world location and the orientation of the camera will permit computing device to determine the real-world locations of objects 408, 412 in images 406, 410. Data acquired by the computing device in vehicle 110 can also include a time stamp with images 406, 410. A time stamp indicates the time at which the image was acquired. Because objects 408, 412 in traffic scene 300 can be moving, the time stamp can be used to determine whether the object 408, 412 in an image 406, 410 is the same as object 404 labeled by CNN 200 in image 402.

Computing device 115 can input images 406, 410 into CNN 200 to label objects 408, 412 after determining from the real-world locations and orientations for stationary camera 310, 312 that the images are viewing portions of traffic scene 300 that include object 404. Computing device 115 can also verify by examining the time stamp for each image 406, 410 that the images 406, 410 were acquired while the object 404 was in the field of view of stationary cameras 310, 312. Computing device 115 can process images 406, 410 to obtain labels and confidence levels for objects 408, 412 in the images 406, 410. In this example, CNN 200 has labeled object 408 in image 406 as: (1) Truck, confidence level 83%; (2) SUV, confidence level 12%; and (3) Van, confidence level 4%. CNN 200 has labeled the object 412 in image 410 as: (1) Truck, 79%; (2) SUV, 11%; and (3) Van, 7%. Based on these labels and confidence levels, computing device 115 can substitute the label "Truck", with an average confidence level of 81% from images 406, 412 for the labels produced by CNN 200 for the object 404 in image 402.

In examples where none of the images 402, 406, 410 yield an object label with a confidence level greater than the threshold, for example 80%, an error condition can be declared by computing device 115. When an error condition is declared, computing device 115 can determine that safe operation of the vehicle 110 is not possible with the current data and command the vehicle 110 to stop. The computing device 115 can also send a message to a server computer 120 via network 130 requesting assistance.

Computing device 115 can use the object 404 with the substitute label to determine a vehicle path for vehicle 110. A vehicle path is typically described by a polynomial function that specifies the path in the direction of travel of vehicle 110 such that computing device 115 can cause vehicle 110 to follow the path by sending appropriate commands to vehicle powertrain controller 112, vehicle brake controller 113, and vehicle steering controller 114 to control vehicle powertrain, brakes and steering, respectively. The polynomial function can be determined to maintain upper and lower limits on vehicle lateral and longitudinal accelerations to produce a safe and efficient vehicle path upon which to travel. Computing device 115 can determine the vehicle path to maintain an appropriate distance from object 404 to avoid contact or near-contact. The appropriate distance will vary depending upon the speed of vehicle 110. At highway speeds, (>55 mph), an appropriate distance can be 60 feet or greater. At slow traffic speeds (<20 mph) an appropriate distance can be about 10 feet or less, for example.

In examples where computing device 115 has substituted an object label from one or more images 406, 410 acquired by a stationary camera 310, 312 included in a traffic infrastructure system 100, computing device can store in local memory the labels and confidence levels determined based on the images 406, 410 by CNN 200 with the image 402 acquired by the vehicle camera. Image 402 and substitute labels and confidence levels can then be uploaded to a server computer 120 via network 130 and used to retrain CNN 200. Retraining CNN 200 with image 402 and substitute labels and confidence levels can improve the ability of the CNN 200 to correctly label an object 404, despite difficult imaging conditions. As discussed above, difficult imaging conditions can include confusing backgrounds, dim lighting, shadows and environmental conditions such as rain or snow. The retrained CNN 200 can be downloaded to a computing device 115 in a vehicle 110 for future use in labeling objects.

Figure 5:
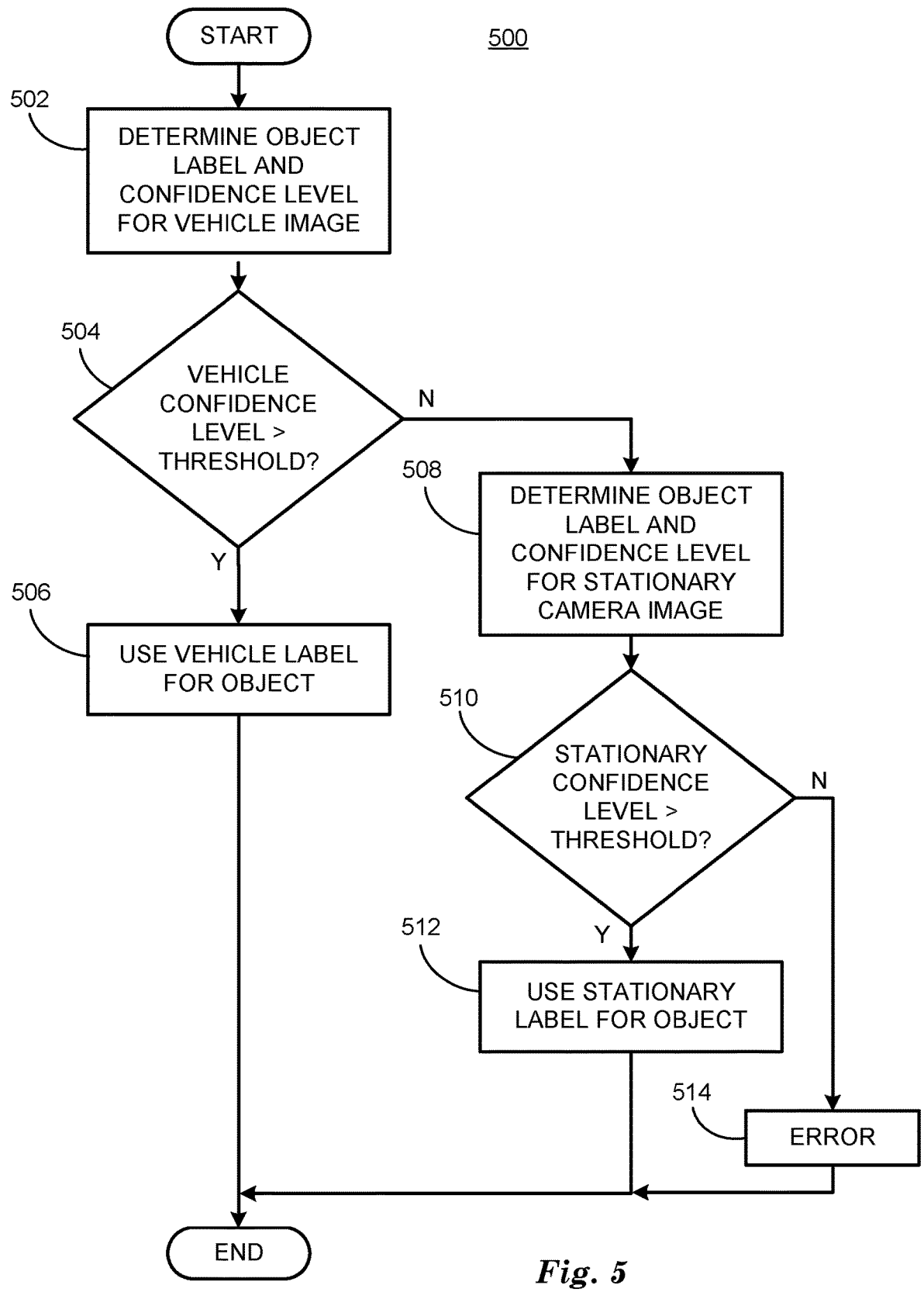
FIG. 5 is a flowchart diagram of an example process to determine an object label.

FIG. 5 is a diagram of a flowchart, described in relation to FIGS. 1-4, of a process for labeling objects in images. Process 500 can be implemented by a processor of computing device, taking as input information from sensors, and executing commands, and outputting object information, for example. Process 500 includes multiple blocks that can be executed in the illustrated order. Process 500 could alternatively or additionally include fewer blocks or can include the blocks executed in different orders.

Process 500 begins at block 502, where a sensor, which can be a video camera, for example, in a vehicle 110 acquires an image 402. The image 402 is communicated to a computing device 115 in the vehicle 110 where it is input to a CNN 200 trained to label objects and determine confidence levels for the labels determined for the objects.

At block 504 the computing device 115 examines the labels and confidence levels output by CNN 200 in response to input image 402. If the highest confidence level output by CNN 200 is greater than a threshold, process 500 passes to block 506. If none of the confidence levels output by CNN 200 is greater than the threshold, process 500 passes to block 508.

At block 506 the computing device 115 uses the object label output by CNN 200 in response to input image 402 acquired by a vehicle camera to operate the vehicle 110. As discussed above in relation to FIG. 4, computing device 115 can determines a vehicle path upon which to operate vehicle 110 that maintains a safe distance from the labeled object 404.

At block 508 computing device 115 acquires one or more images 406, 410 from one or more stationary cameras 310, 312 included in a traffic infrastructure system 100. As discussed above in relation to FIG. 4, one or more edge computing nodes 170 can acquire images 406, 410 from stationary cameras 310, 312 along with location data, orientation data and time stamps for each of the images 406, 410. The location data, orientation data and time stamps can be used by computing device 115 to determine whether an object 404 is in the field of view of stationary cameras 310, 312 at the time the images 406, 410 were acquired. The computing device 115 can determine that images 406, 410 include different views of the same object as object 404 in image 402 acquired by a camera included in a vehicle 110. Computing device 115 processes images 406, 410 with CNN 200 to determine object labels and confidence levels for objects 408, 412, respectively. In some examples, a copy of CNN 200 can execute on edge computing nodes 170 and the object labels and confidence levels communicated to computing device 115.

At block 510 computing device 115 examines the object labels and confidence levels output from CNN 200 in response to input images 406, 410 to determine whether any of the confidence levels are greater than the threshold. If one or more confidence levels for the same label are greater than the threshold, process 500 passes to block 512. If none of the confidence levels corresponding to object labels are greater than the threshold, process 500 passes to block 514.

At block 512 computing device 115 uses the object label with a confidence level greater than the threshold and the image 402 acquired by the vehicle sensor to operate vehicle 110 as discussed above in relation to FIG. 4.

At block 514 computing device 115 declares an error condition based on not obtaining an object label with a confidence level greater than the threshold. Process 500 can also reach block 514 if CNN 200 returns two or more differing object labels with confidence levels greater than the threshold. As discussed above in relation to FIG. 4, when an error condition is declared, the vehicle 110 can be instructed to stop and assistance requested via the network 130. Following block 514 process 500 ends.

At block 506 the vehicle 110 can operate by using a computing device 115 to control vehicle powertrain, steering and brakes via controllers 112, 113, 114 to operate vehicle powertrain, vehicle steering and vehicle brakes. Following block 506 process 500 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising:
   a processor; and
   a memory, the memory including instructions executable by the processor to:
   determine a mobile sensor object label, and a mobile sensor confidence level for the mobile sensor object label, by processing a mobile sensor image that includes an object with a neural network;
   determine a stationary sensor object label, and a stationary sensor confidence level for the stationary sensor object label, by processing a stationary sensor image that includes the object with the neural network, wherein the mobile sensor object label and the stationary object label are based on different views of the object; and
   if the stationary sensor confidence level is greater than the mobile sensor confidence level, operate a vehicle by determining a vehicle path based on the stationary sensor object label.

2. The computer of claim 1, the instructions including further instructions to retrain the neural network by applying the stationary sensor object label to the vehicle sensor image when the stationary sensor confidence level is greater than the vehicle sensor confidence level.

3. The computer of claim 1, wherein the vehicle path is based on a polynomial function and the vehicle path avoids contact or near-contact with an object corresponding to the vehicle sensor object label.

4. The computer of claim 1, wherein the vehicle sensor confidence level and the stationary sensor confidence level are probabilities that the vehicle sensor object label and the stationary sensor object label are correctly identified by the neural network.

5. The computer of claim 1, wherein the stationary sensor image includes data regarding a location of the stationary sensor object and a time at which the stationary sensor image was acquired.

6. The computer of claim 5, wherein the location of the stationary sensor object is a real-world location in global coordinates and is based on a location and orientation of the stationary sensor.

7. The computer of claim 6, the instructions including further instructions to determine that the vehicle sensor object and the stationary sensor object are different views of a same object based on the location of the vehicle sensor object, the location of the stationary sensor object, and the time at which the stationary sensor object was acquired.

8. The computer of claim 1, wherein the neural network includes convolutional layers and fully connected layers.

9. The computer of claim 1, wherein the neural network is trained using training datasets that include images of objects and ground truth that includes object labels.

10. The computer of claim 1, wherein a second neural network included in a traffic infrastructure system is used to determine the stationary sensor object label and the stationary sensor confidence level.

11. The computer of claim 1, wherein a traffic infrastructure system includes a second computer including a second processor and second memory including instructions executable by the second processor to retrain the neural network by applying the stationary sensor object label to the vehicle sensor image.

12. The computer of claim 11, wherein the second computer downloads the retrained neural network to the computer.

13. A method, comprising:
   determining a mobile sensor object label, and a mobile sensor confidence level for the mobile sensor object label, by processing a mobile sensor that includes an object with a neural network;
   determining a stationary sensor object label, and a stationary sensor confidence level for the stationary sensor object label, by processing a stationary sensor image that includes the object with the neural network, wherein the mobile sensor object label and the stationary object label are based on different views of the object; and
   if the stationary sensor confidence level is greater than the vehicle sensor confidence level, operating a vehicle by determining a vehicle path based on the stationary sensor object label.

14. The method of claim 13, further comprising retraining the neural network by applying the stationary sensor object label to the vehicle sensor image when the stationary sensor confidence level is greater than the vehicle sensor confidence level.

15. The method of claim 13, wherein the vehicle path is based on a polynomial function and the vehicle path avoids contact or near-contact with an object corresponding to the vehicle sensor object label.

16. The method of claim 13, wherein the vehicle sensor confidence level and the stationary sensor confidence level are probabilities that the vehicle sensor object label and the stationary sensor object label are correctly identified by the neural network.

17. The method of claim 13, wherein the stationary sensor image includes data regarding a location of the stationary sensor object and a time at which the stationary sensor image was acquired.

18. The method of claim 17, wherein the location of the stationary sensor object is a real-world location in global coordinates and is based on a location and orientation of the stationary sensor.

19. The method of claim 18, further comprising determining that the vehicle sensor object and the stationary sensor object are different views of a same object based on the location of the vehicle sensor object, the location of the stationary sensor object, and the time at which the stationary sensor object was acquired.

20. The method of claim 13, wherein the neural network includes convolutional layers and fully connected layers.

* * * * *